United States Patent [19]

Plyter

[11] Patent Number: 5,138,909
[45] Date of Patent: Aug. 18, 1992

[54] HAND-HELD, PNEUMATIC WIRE STRIPPING TOOL

[75] Inventor: Walter J. Plyter, Maitland, Fla.

[73] Assignee: Daniels Manufacturing Corporation, Orlando, Fla.

[21] Appl. No.: 562,112

[22] Filed: Aug. 1, 1990

[51] Int. Cl.⁵ .............................................. H02G 1/12
[52] U.S. Cl. ...................................... 81/9.41; 173/169
[58] Field of Search .............. 81/57.39, 57.4, 9.4–9.43; 173/163, 169

[56] References Cited

U.S. PATENT DOCUMENTS

| | | | |
|---|---|---|---|
| 1,666,277 | 4/1928 | White. | |
| 2,285,167 | 6/1942 | Montgomery | 81/9,51 |
| 2,735,320 | 2/1956 | Green | 81/9.5 |
| 3,176,550 | 4/1965 | Marotte | 81/9.51 |
| 3,222,957 | 12/1965 | Kramer et al. | 81/9.51 |
| 3,223,182 | 12/1965 | Mikiya | 173/169 X |
| 3,326,304 | 6/1967 | Johnson | 173/169 |
| 3,505,720 | 4/1970 | Heimbrock | 29/203 |
| 3,626,431 | 12/1971 | Thierri et al. | 29/203 D |
| 3,750,720 | 8/1973 | Steigerwald | 140/149 |
| 3,765,277 | 10/1973 | Sorensen | 81/9.5 A |
| 3,920,088 | 11/1975 | Dudek | 173/169 |
| 4,067,250 | 1/1978 | Owen, Jr. et al. | 81/9.51 |
| 4,109,553 | 8/1978 | Drinkard, Jr. et al. | 81/9.51 |
| 4,403,383 | 9/1983 | Dewhurst et al. | 29/33 M |
| 4,638,692 | 1/1987 | Bensussen et al. | 81/9,41 |
| 4,639,824 | 1/1987 | Furlong et al. | 361/179 |
| 4,679,117 | 7/1987 | Butcher et al. | 361/181 |
| 4,682,272 | 7/1987 | Furlong et al. | 361/181 |
| 4,782,578 | 11/1988 | Wu | 29/564.4 |
| 4,803,903 | 2/1989 | Wolter et al. | 81/9,43 |

Primary Examiner—James G. Smith
Attorney, Agent, or Firm—James H. Beusse

[57] ABSTRACT

A pneumatically operated hand-held wire stripping tool having a first housing for supporting operating elements of the tool and a second housing for substantially containing pneumatic elements of the tool is constructed such that the first housing is rotatably coupled to the second housing for rotation into either a left hand or right hand operating position. The operating elements of the tool include a first pair of opposed clamping jaws and a second pair of opposed cutting blades. The jaws and blades are coupled such that initial actuation of the tool closes the jaws and blades and continued actuation displaces the jaws with respect to the blades. The pneumatic elements comprise a pneumatic valve and a diaphragm supported on a stem with the stem extending through the diaphragm and into engagement with one of the operating elements of the tool. An aperture extends coaxially with and substantially through the stem and terminates adjacent the operating element. A viaduct extends from the valve and into the aperture for providing air communication between the valve and aperture. An opening in the stem passes through the aperture for communicating air to one side of the diaphragm.

10 Claims, 2 Drawing Sheets

HAND-HELD, PNEUMATIC WIRE STRIPPING TOOL

This invention relates to pneumatically powered wire stripping tools and, more particularly, to a powered wire stripping tool which emulates the operation of a conventional hand-held, manually operated plier type wire stripping tool.

BACKGROUND OF THE INVENTION

For many years, the industry standard for hand-held wire stripping tools has been the Custom Stripmaster Wire Stripper manufactured and sold by Ideal Corporation. This tool comprises a pair of opposed jaws arranged for clamping and holding an insulated wire during stripping. A pair of cutting blades are positioned adjacent to the clamping jaws and operate substantially in unison with the clamping jaws to cut through insulation on a wire being held in the clamping jaws and to strip the severed insulation by moving in a direction away from the clamping jaws. The tool is operated by a pair of handles extending in a plier-like fashion from the body of the tool. As the handles are squeezed, the clamp jaws and the cutting blades first move into their operative positions to clamp the wire and to sever the insulation while continued squeezing of the jaws thereafter causes the cutting blades to move away from the clamping jaws pulling the severed insulation from the wire. When the handles are released, the cutting blades open prior to the blades moving back towards the clamping jaws allowing the blades to move back into their normal rest position without hitting against the ends of the wire being held in the clamp jaws.

While the manually operated wire stripping tool described above continues to be an industry standard, it is not believed to be the most efficient method for wire stripping since it does require manual operation by the user in order to strip a wire. In a production application, the continued opening and closing of the plier-type device is not only tiring but could lead to medical problems such as carpal-tunnel syndrome. Thus, it is desirable to provide a wire stripping tool which incorporates the advantages of the clamping and cutting action of the conventional wire stripping tool while avoiding the difficulties inherent in manual operation of a plier-type device.

SUMMARY OF THE INVENTION

It is an object of the present invention to provide a pneumatically operated, hand-held wire stripping tool which overcomes the above and other disadvantages of the prior art.

In an illustrative form, the present invention comprises a pneumatically powered side feed wire stripping tool for stripping insulation from a wire utilizing a pair of opposed clamping jaws positioned adjacent a pair of opposed cutting blades with at least one of the jaws and one of the blades being movable one towards the other of the jaws and blades in order to clamp a wire and sever insulation on the wire. The jaws are also displaceable from the cutting blades in order to pull the severed insulation from the wire. At least one of the jaws and at least one of the blades is connected to a respective one of first and second pivot arms which pivot about an intermediate point with one end of each of the pivot arms being connected to a respective one of the jaws and blades. A second end of each of the pivot arms is connected to a corresponding extension arm, which extension arms are coupled to a piston assembly of a pneumatic actuator. When the piston assembly is operated in a direction to push on the extension arms and cause the pivot arms to thereby rotate about their respective intermediate points, the jaws and cutting blades are caused to move into their closed position. Further movement of the piston assembly against the extension arms causes the cutting blades, which are mounted on a movable slide, to be displaced away from the clamping jaws to thereby pull the severed insulation from the wire. Preferably, the pivot arm on the cutting blades is mounted about the intermediate pivot point such that the cutting blades close prior to closing of the clamping jaws in order to allow a user to verify that the wire to be stripped is placed in a correct position within the cutting blades. The ends of the extension arms coupled to the piston assembly are arranged such that the ends may slide in the direction of displacement of the cutting blades from the clamping jaws as the piston assembly is moved towards the cutting blades.

That portion of the wire stripping tool thus far described is mounted within a first housing assembly while a pneumatic actuator which powers the piston assembly is mounted within a second housing assembly. The first housing assembly is rotatably coupled to the second housing assembly allowing rotation of one housing with respect to the other housing assembly to thereby accommodate either left-hand or right-hand operation of the stripping tool. The second housing containing the pneumatic actuator incorporates a side mounted actuating trigger for use by the operator for controlling the operation of the stripping tool.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
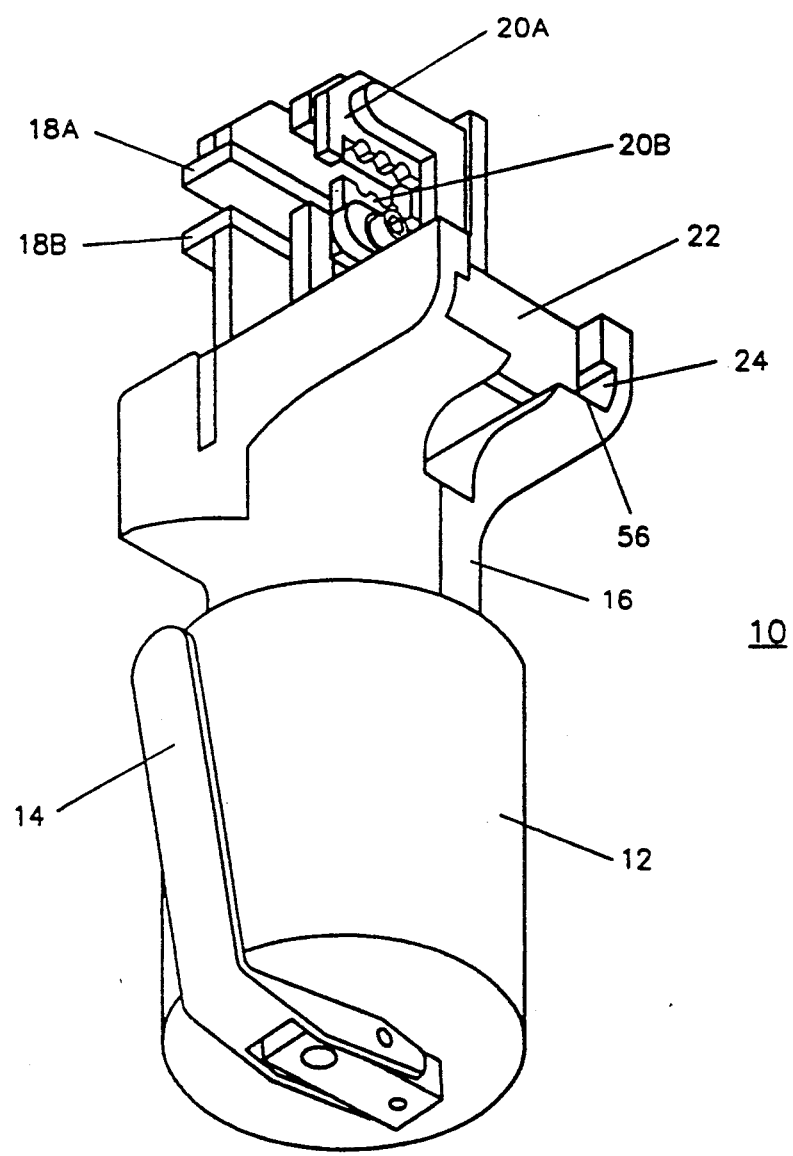
FIG. 1 is a perspective view of one form of wire stripper in accordance with the present invention.

Referring now to FIG. 1, there is shown a perspective view of one form of wire stripping tool in accordance with the present invention. The tool 10 includes a lower housing assembly 12 containing a pneumatic actuator. The actuator is operated by a trigger 14 extending from one side of the lower housing. An air hose (not shown) can be attached to the bottom of the lower housing 12 to provide air for operating the pneumatic actuator. The tool further includes an upper housing assembly 16 containing the mechanical components of the wire stripping tool. Attached to the top of the upper housing 16 is a pair of clamping jaws 18A and 18B with at least the upper jaw 18A being movable toward the lower jaw 18B in order to clamp a wire placed therebetween. Positioned adjacent the clamping jaws 18A, 18B is a pair of opposed cutting blades 20A and 20B with at least the upper cutting blade 20A being displaceable towards the lower blade 20B in order to sever insulation on a wire placed between the cutting blades. The cutting blades 20A, 20B are mounted on a sliding support 22 which slides within the slot 24 formed in the upper housing assembly 16.

As will be apparent, the operation of the mechanical portion of the wire stripping tool 10 is essentially the same as that of the prior conventional manually operated Ideal Stripmaster tool. In particular, the cutting blades 20A, 20B and the clamping jaws 18A, 18B are substantially the same as in the conventional tool and function in substantially the same manner. The separation of the blades 20 from the clamping jaws 18 is different in that the blades are mounted on a carrier 22 which slides laterally with respect to the clamping jaws 18 rather than pivoting as is done in the manually operated apparatus. Beyond the fact of the primary difference due to pneumatic operation of the tool 10 as opposed to hand operation of the prior conventional stripper, a significant difference is the fact that the stripper 10 utilizes a second housing 12 which is rotatable with respect to the first housing 16 so that the stripping tool can be utilized by either left-hand or right-hand operation while still maintaining the standard positioning of the clamping jaws 18 and cutting blades 20.

Figure 2:
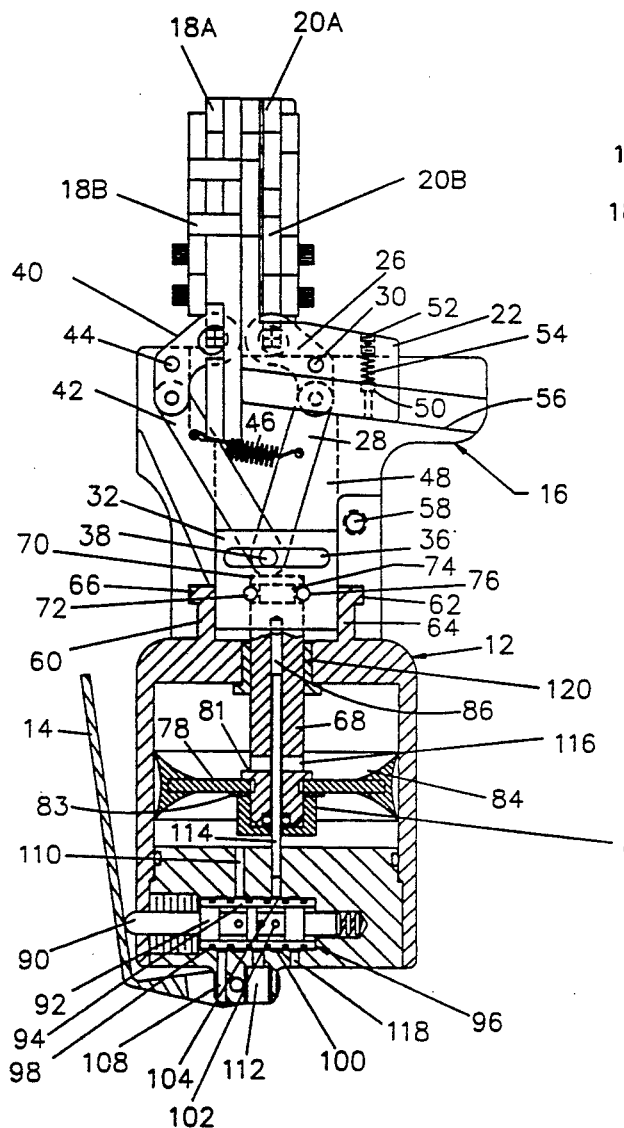
FIG. 2 is a cross-sectional view of the wire stripper of FIG. 1 with the pneumatic actuator in a non-actuated position.

Turning now to FIG. 2, there is shown a cross-sectional view of the wire stripping tool 10 of FIG. 1. The upper or movable cutting blade 20A is coupled to one end of a first pivot arm 26. The second end of the extension arm 28 is connected to a slidable support illustrated as a sliding block 32 forming a part of a piston assembly 34 extending into the lower housing 12. The sliding block 32 has a slot 36 extending transverse to a direction of motion of the sliding plate 32. A pin 38 is positioned in the slot 36 and is sized to allow the pin to move from end to end of the slot 36. The second end of the extension arm 28 is attached to the pin 38. This coupling of the end of the arm 28 to the pin 38 within the slot 36 allows the second end of the arm 28 to move transverse to the direction of sliding motion of the block 32. A second pivot arm 40 has a first upper end coupled to the upper clamping jaw 18A and a second lower end connected to a first end of a second extension arm 42. A second end of the extension arm 42 is also coupled to the pin 38 riding in the slot 36. The pivot arm 40 pivots about a pivot pin 44 attached to the housing 16. A spring 46 is coupled between the extension arms 42 and 38 to urge them towards their rest position as shown in FIG. 2 when the slide member 32 is pulled down into the rest position shown in FIG. 2.

The pivot arm 26 is attached to the support 22 by means of the pin 30. When the piston assembly 34 is actuated, the sliding block 32 moves upward within a cavity 48 in the upper housing 16. Movement of the slide member 32 pushes the extension arms 28 and 42 upward so that they act against the lower ends of the two pivot arms 26 and 40, respectively. This action causes the pivot arms to pivot about their respective intermediate points at pins 30 and 44. The pivot arm 26 and its extension arm 28 are arranged such that arm 26 pivots to a greater degree than arm 40 during the initial movement of the slide member 32. This causes the cutting blade 20A to move to its normal closed position prior to the clamping jaw 18A moving to its closed position. The purpose of closing the cutting blades before closing the clamping jaws is to allow the user to assure that a wire which is being stripped is placed within the proper stripping position within the blades 20A and 20B. As can be seen in the perspective view of FIG. 1, the blades contain a number of predefined serrations each of which is a different size for severing the insulation on different size wires. However, it will be recognized that the relative arrangements of the arms 26, 28 and 40, 42 could be arranged to provide for closing of the clamp jaws 18 prior to closing of the blades 20. Continued actuation of the piston assembly by allowing additional air to enter into the lower housing 12 first causes the clamping jaws 18A to move to their clamped position and thereafter causes the slide 22 to be pushed in an outward direction in order to accommodate the shortened vertical distance between the pin 38 and the slide member 32 and the pins 30 and 44. More particularly, once the pivot arms 26 and 40 have reached their full extent of movement causing the blades 20 to be closed and the clamping jaws 18 to also be closed, any additional movement of the slide member 32 can only be accommodated by forcing one of the intermediate pin points 30 and 44 to move with respect to the other. Since the pin point 44 is fixed to the housing 16, t he slide 22 to which the intermediate pin 30 is fixed must move outwardly carrying the cutting blades 20A and 20B away from the clamping jaws 18A, 18B. Since the cutting blades 20 sever the insulation on the wire when they are closed, the outward movement of the blades away from the clamping jaws causes the severed insulation to be pulled outward and away from the wire.

Figure 3:
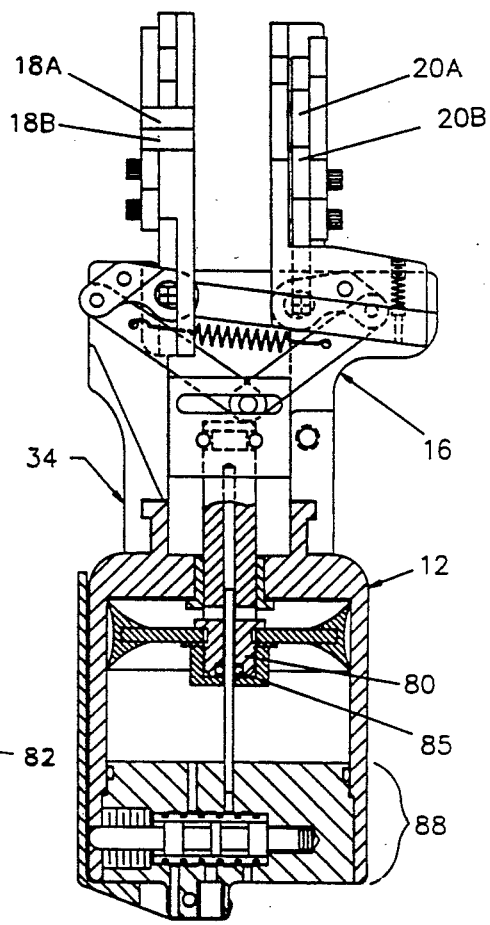
FIG. 3 is a cross-sectional view of the wire stripper of FIG. 1 with the pneumatic actuator in an actuated position.

In order to assure that the cutting blades and clamping jaws are fully closed prior to movement of the support 22, there is provided a spring loaded elastomeric guide 50 held in place within the support 22 by a set screw 52. The spring 54 is pushed downward into the nylon guide by adjustment of the set screw. The guide rides on a lower surface 56 within the slot 24 in which the support 22 is positioned. The guide 50 provides a controllable amount of friction interface between the support 22 and the adjacent surface 56 of the slot 24. By adjusting the set screw 52, the amount of friction can be controlled to assure that the jaws and blades close prior to movement of the support 22. An additional concern with the operation of the wire stripping tool 10 is the action of the blades 20A and 20B when the operation of the piston assembly 34 is reversed in order to return the blades 20A and 20B to their normal rest position adjacent the jaws 18A and 18B. Although the design is such that the first action that will occur as the slide member 32 is pulled downward is to cause the pivot arm 26 to rotate in an opposite direction thereby opening the blade 20A, it is normal for the blades 20A and 20B to return to their rest position prior to fully opening of the jaws 18A and 18B. On occasion, it has been found that the lower jaw 20B would catch some of the wire strands of the wire being stripped during the return operation. This would cause the wire strands to be jammed back towards the jaws 18A and 18B and result in a bird cage effect. Since this is undesirable, Applicants have found that by changing the angle of operation of the support 22 this problem can be obviated. In particular, Applicants have found that the slot 24 is desirably arranged with a negative 7° pitch so that the support 22 moves slightly downward as it pulls the blades 20A and 20B away from the jaws 18A and 18B. This degree of pitch does not bend the wire being stripped although there is some deflection of the end of the wire. Nevertheless, Applicants have found that the elasticity of the wire causes it to return at least partly to its normal straight configuration once the blades have pulled the insulation passed the end of the wire. Consequently, when the blades are returned to their position adjacent the clamping jaws, the lower blade approaches the wire from its underside and does not contact the end of the wire but rather brushes the wire at some points adjacent the point at which the insulation was originally severed. FIG. 3 represents the wire stripping tool 10 with the sliding block 32 in its highest vertical position and the cutting blades 20A and 20B fully displaced from the jaws 18A and 18B.

As was previously mentioned, the upper housing 16 is rotatably mounted to the lower housing 12. This is accomplished by forming the upper housing 16 as two hemispheres joined together by at least one bolt indicated at 58 in the figures. Within the lower portion of the housing 16, there is formed a recess 60 terminating in an annular groove 62. At the upper end of the housing 12 there is formed an extension 64 which terminates in an annular ring 66 sized to fit within the annular groove 62. When the housing 16 is placed on top of the lower housing 12 in its assembled position, the ring 66 fits within the slot 62 and prevents separation of the two housings while at the same time providing for relative rotation between the housings. Since the housings are free to rotate with respect to one another, there must also be provided means for the piston assembly 34 which extends from one housing to the other, to be rotatably connected. The piston assembly 34 has a stem member 68 which extends into a cavity 70 formed in the lower surface of the sliding member 32. The stem 68 is held in position within the cavity 70 by means of a pair of roll pins 72 captured in an annular slot 74 formed near the top of the stem 68, with the roll pins 72 also fitting within apertures 76 through the block 32 which form grooves in the inner sidewalls of the cavity 70 adjacent the slot 74. The stem 68 extends downward and is attached to a metal plate 78 within the lower housing 12. In a preferred form, the lower end 80 of the stem 68 is threaded and passes through an aperture in the center of the plate 78 until a shoulder 81 on the stem 68 abuts against the plate. A nut 82 is then attached on an opposite side of the plate by threadedly engaging the threaded end 80 to hold the plate 78 firmly positioned against the end of the stem 68. A Belville washer 83 may be used between nut 82 and plate 78 to assure a secure fit against shoulder 81. The plate 78 also has attached to it a flexible diaphragm 84 which may be formed of rubber or suitable synthetic material. The diaphragm 84 provides a sealing relationship between the edges of the plate 78 and the adjacent inner surfaces of the lower housing 12. The stem 68 also includes a central aperture 86 extending from the threaded end of the stem to a point near but not passing through the upper end of the stem 68. The stem 68 is guided and vertically oriented by a sintered metal bearing 120 which also provides a sealing function between the pneumatic chamber in housing 12 and the cavity 48 in the upper housing 16.

A commercially available pneumatic actuator 88 is attached to the lower end of the lower housing 12 and may include an externally extending push button actuator 90 which is engaged by lever 14. The actuator includes a sliding valve 92 fitting within an aperture 94 in a flow control mechanism 96. The valve 92 comprises a sequence of alternating sections of large diameter and small diameter with the spacing between the sections of large diameter providing an air flow path when the valve is properly positioned and the large diameter sections blocking air flow between sections. The flow control mechanism 96 has a plurality of grooves with alternating ones of the grooves containing a sealing mechanism or O-ring 98. The grooves 100 spaced between the O-rings 98 are each coupled by means of an aperture indicated at 102 to the cavity 104 within the direction control mechanism 96 in which the valve 92 is positioned. In the position illustrated in FIG. 2, the valve 92 is positioned such that the exhaust aperture 108 is coupled to the cavity underneath the diaphragm 84 by means of the viaduct 110. At the same time, the air inlet 112 is connected to the viaduct 114 which extends into the aperture 86 of the valve stem 68. This allows inlet air coming into inlet 112 to pass into the stem 68 so that it can be transferred to the upper side of the diaphragm 84. The viaduct 114 fits loosely within the aperture 86 so that air can flow along the sides of the viaduct 114 and exit into the upper cavity above the diaphragm 84 by means of the apertures 116 in the stem 68. An O-ring 85 fits around viaduct 114 to prevent air flow from aperture 86 into the space below diaphragm 84. Thus, in the position illustrated in FIG. 2, air is exhausted from below the diaphragm 84 and admitted into the space above the diaphragm 84 thereby forcing the valve stem 68 to its downward position and retracting the pivot arms 26 and 40 to cause the blades 20A and 20B to be opened and the jaws 18A and 18B to be opened. In FIG. 3, it can be seen that the valve button 90 has been depressed moving the valve 92 to its right-hand position as shown in FIG. 3 and coupling the air inlet 112 to the viaduct 110 to allow air to be injected below the diaphragm 84. At the same time, the stem 114 is coupled to a second exhaust 118 allowing air to be bled from the cavity above the diaphragm 84. This action forces the diaphragm 84 upward causing the valve stem 68 to push on the sliding member 32 and forcing the pivot arms 26 and 40 into the position illustrated in FIG. 3. It will also be seen that by appropriately allowing small amounts of air into the space below the diaphragm 84, an initial movement of the blades 20A can be effected to determine if the wire being stripped is positioned in the right sized space within the blade. This action can be controlled simply by some slight movement of the push button 90 followed by a slight release of it to move the valve 92 to a position to prevent further entry of air into the tool.

While the invention has been described in what is presently considered to be a preferred embodiment, many modifications and variations will become apparent to those skilled in the art. Accordingly, it is intended that the invention not be limited to the specific disclosed embodiment but be interpreted within the full spirit and scope of the appended claims.

What is claimed is:

1. A pneumatically powered, side-feed wire stripping tool for stripping insulation from a wire and including a pneumatically powered piston assembly comprising:

first and second cutting blades mounted in opposed aligned relationship, at least one of the blades being movable toward the other of the blades and operable therewith when the blades are in a closed position to sever insulation on a wire inserted therebetween;

first and second clamping jaws mounted in opposed aligned relationship, at least one of the jaws being movable toward the other of the jaws and operable to clamp and hold a wire in a fixed position during stripping of insulation from the wire;

a first pivot arm having a first end and a second end and being mounted for pivoting about an intermediate point between said first and second ends, said first end being connected to one of said first and second cutting blades for effecting movement of said one of said blades with respect to another of said blades when said arm pivots about said intermediate point;

a second pivot arm having a first end and a second end and being mounted for pivoting about an intermediate point between said first and second ends thereof, said first end of said second pivot arm being connected to one of said first and second clamping jaws for effecting movement of said one of said jaws with respect to another of said jaws when said second pivot arm pivots about its said intermediate point; and first and second extension arms each having a first end and a second end, said first end of each of said extension arms being rotatably coupled to a respective one of said second ends of a corresponding one of said first and second pivot arms, said second ends of said extension arms being rotatably coupled to the piston assembly whereby movement of the piston assembly in line with said jaws and said blades effects pivotable motion of said first and second pivot arms for effecting operation of said jaws and said blades.

2. The wire stripping tool of claim 1 and including a slidable support, said intermediate point on said first pivot arm and said blades being coupled to said slidable support, said support being slidable in a direction approximately perpendicular to the direction of movement of said one of said blades, movement of said piston assembly toward said blades being effective to force said support to slide such that said blades are displaced from said jaws.

3. The wire stripping tool of claim 2 wherein said first pivot arm is coupled about said intermediate point thereof such that said blades move into a closed position prior to clamping movement of said jaws.

4. The wire stripping tool of claim 2 wherein said second ends of said extension arms are coupled to said piston assembly such that said second ends slide substantially parallel to the direction of displaced motion of said blades when said piston assembly moves toward said blades.

5. The wire stripping tool of claim 2 and including spring means coupled between said first and second extension arms for urging said blades toward said jaws.

6. The wire stripping tool of claim 2 and including:
a first housing assembly for supporting at least said blades, said jaws, said first and second pivot arms, said first and second extension arms, and a portion of said piston assembly; and a second housing assembly for supporting a remaining portion coupled to said first housing to permit selective position of said second housing with respect to said first housing.

7. A pneumatically operated hand tool having a first housing for supporting operating elements f the tool and a second housing for substantially containing pneumatic elements of the tool, the first housing being rotatably coupled to the second housing for rotation into either a left hand or right hand operation position, said pneumatic elements comprising a pneumatic valve and a diaphragm supported on a stem, the stem extending through the diaphragm and into engagement with at least one of the operating elements of the tool, an aperture extending coaxially with and substantially through the stem and terminating adjacent the at least one of the operating elements of the tool, a viaduct extending from the valve and into the aperture for providing air communication between the valve and aperture, and an opening in the stem passing through the aperture for communicating air to one side of the diaphragm.

8. The hand tool of claim 7 and including seal means between the aperture and the viaduct for blocking air to another side of the diaphragm.

9. The hand tool of claim 8 wherein the operating elements of the tool include a first pair of opposed clamping jaws and a second pair of opposed cutting blades, the at least one of the operating elements being coupled to the jaws and blades such that initial actuation of the valve effects closing of the jaws and blades and continued actuation of the valve effects displacement of the jaws with respect to the blades.

10. A pneumatically operated tool including a housing for supporting operating elements of the tool and a pneumatic assembly for controlling operation of the elements o the tool, characterized in that the pneumatic assembly comprises a pneumatic valve and a diaphragm supported on a stem, the stem extending through the diaphragm and into engagement with at least one of the operating elements of the tool, an aperture extending coaxially with and substantially through the stem and terminating adjacent the at least one of the operating elements of the tool, a tube extending from the valve and into the aperture for providing air communication between the valve and aperture, and an opening in the stem passing through the aperture for communicating air to one side of the diaphragm, a seal positioned in the aperture nd encircling the tube for blocking air leakage from the aperture to another side of the diaphragm, the valve being positional in a first position for directing air into the tube for urging the diaphragm in a first direction and positional in a second position for bleeding air from our of the tube to permit movement of the diaphragm in a second direction.

* * * * *